April 9, 1974
R. BINDER ET AL
METHOD AND APPARATUS FOR PRODUCING AN EVEN CONTINUOUS LAYER OF FIBERS
Re. 27,967
Original Filed Oct. 14, 1970
5 Sheets-Sheet 1
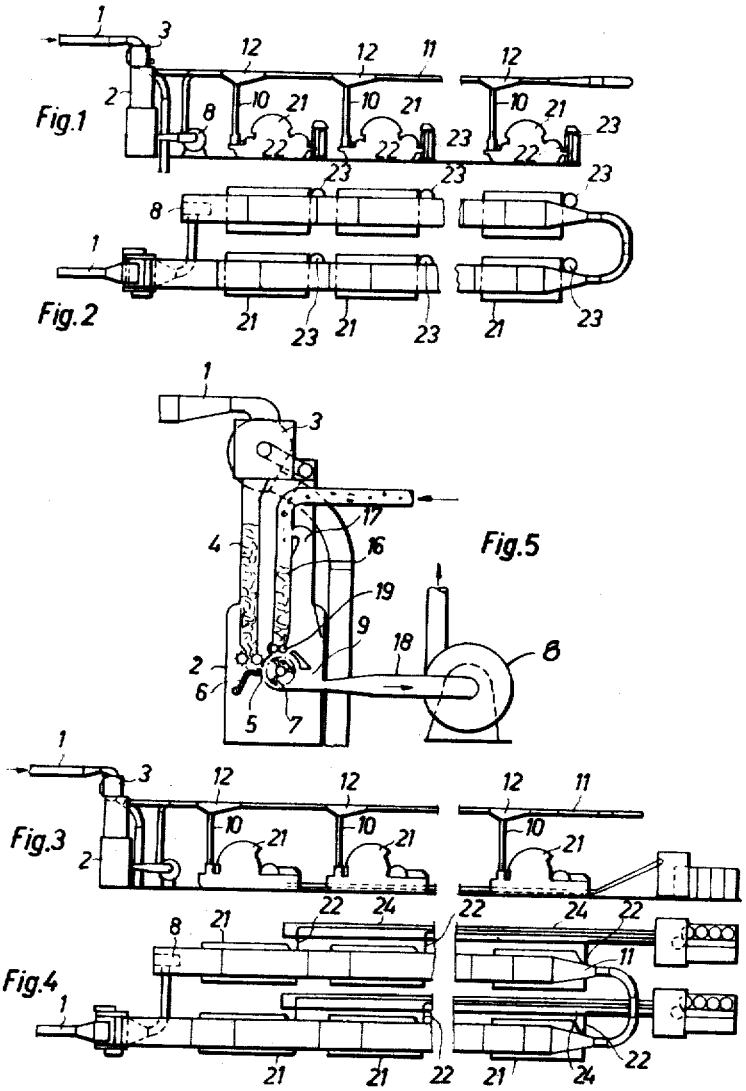
INVENTORS
ROLF BINDER
CHRISTOF GRÜNDLER
BY RUDOLF WILDBOLZ
Kenyon & Kenyon Reilly Carr & Chapin
ATTORNEYS INVENTORS
ROLF BINDER
CHRISTOF GRÜNDLER
BY RUDOLF WILDBOLZ
Kenyon & Kenyon Reilly Carr & Chapin
ATTORNEYS INVENTORS
ROLF BINDER
CHRISTOF GRÜNDLER
BY RUDOLF WILDBOLZ
Kenyon & Kenyon Reilly Carr & Chapin
ATTORNEYS INVENTORS
ROLF BINDER
CHRISTOF GRÜNDLER
BY RUDOLF WILDBOLZ
Kenyon & Kenyon Reilly Carr & Chapin
ATTORNEYS INVENTORS
ROLF BINDER
CHRISTOF GRÜNDLER
BY RUDOLF WILDBOLZ
Kenyon & Kenyon Reilly Carr & Chapin
ATTORNEYS United States Patent Office Re. 27,967
Reissued Apr. 9, 1974

27,967

METHOD AND APPARATUS FOR PRODUCING AN EVEN CONTINUOUS LAYER OF FIBERS

Rolf Binder, Raterschen, and Christof Grundler and Rudolf Wildbolz, Winterthur, Switzerland, assignors to Rieter Machine Works, Ltd., Winterthur, Switzerland Original No. 3,709,406, dated Jan. 9, 1973, Ser. No. 80,656, Oct. 14, 1970. Application for reissue June 27, 1973, Ser. No. 373,984
Claims priority, application Switzerland, Oct. 15, 1969, 15,461/69; Sept. 14, 1970, 13,602/70
Int. Cl. D01g *15/40*
U.S. Cl. 222—55 22 Claims

Matter enclosed in heavy brackets [ ] appears in the original patent but forms no part of this reissue specification; matter printed in italics indicates the additions made by reissue.

ABSTRACT OF THE DISCLOSURE

The fiber arrangement removed from the feed chute is monitored down stream of the chute to detect deviations in thickness or mass of the fiber arrangement from a preset value so that the deviations are used to cause an increase or decrease of the pneumatic pressure acting on the top of the fiber flock column. The change in pressure results in a change in the amount of pressure drop to which the column is subjected so that the degree of condensation of the column is likewise changed to eliminate or reduce further deviations.

This invention relates to a method and apparatus for producing fiber strands and, more particularly, for producing an even continuous arrangement of fibers from a continuous stream of individualized fiber flocks.

It has been known in the preparation of staple fiber for spinning to open fiber flocks into small sizes by means of a beater, to transfer the opened flocks directly into a feed chute provided at a card without the formation of laps for condensing of the fiber within the feed chute and to discharge the same as a bat. In this way, a functional unit has been formed between the beater and card. However, it has been found that in the transport of the loose fiber material within this functional unit variations of flow have occurred such that a certain degree of irregularity in density of the chute output material has occurred. These irregularities have then been transmitted into the web taken from the card as well as into the sliver formed from the web. This results in a disadvantage in subsequent processing steps.

In order to prevent too high a degree of irregularity in the chute output, costly additional processing steps or the use of more complex processing equipment have been required.

It has also been known to connect a plurality of feed chutes to a pneumatic flock transporting duct wherein the duct has been closed at one end and the arrangement has been provided with a feed device controlled according to the filling level of the feed chutes. The chutes have also been provided with vertical slots through which the air stream has been separated from the flocks and which have been increasingly covered with flocks until being finally entirely covered as the flock, level in the chute has mounted. In this arrangement, the pressure in the chutes and in the transporting duct reaches a maximum at which time, the supply is stopped until the pressure is reduced sufficiently as the slots are uncovered owing to the decrease in the level of the material in the chutes. In order to maintain sufficient material levels in the chutes, the material must be supplied with a small surplus. Thus, the duct has been supplied with flock material intermittently with a result that the pressure has constantly varied between a maximum and minimum. This has, however, resulted in variations of the flock material density depending directly on the pressure drop acting on the material in the chute.

The same results have also been obtained where the flock material, after being deposited in a first chute, has been transferred after passing through a beater into a second chute arranged below the first and condensed in the second chute by means of intermittent impulses of compressed air generated at a certain frequency and pressed through the flock material column. In this case, the material supply to the lower chute has been controlled by a pressure control switch (manometer-relay) which has interrupted the supply if a pressure corresponding to a certain material level is reached and thereafter has initiated the supply when the pressure drops to a lower value due to the decrease of the material level. Since the average pressure to which the flock material column has been subjected varies between two extreme values, corresponding variations of fiber material density in the chute and in the fiber layers taken from the chute have necessarily occurred.

In cases such as the above, it has been proposed to transfer and double the slivers produced on a group of cards into a drawframe, to deliver the silver from the drawframe into cans and to weight the sliver upon completion of the filling of a can. In a known arrangement, in order to reduce any irregularities in the delivered sliver, the set value of the auto-evening drawframe has been adjusted according to the weight deviations of a sliver filled can from a set weight. In another known arrangement, the set values of all pressure control switches provided in the lower chutes have been correspondingly adjusted by means of a servo-motor. These techniques, however, have a further and decisive disadvantage in that the time lag between the measurement of the weight of a full can and the point of adjustment has been very long, i.e., only very long term variations over a period of hours can be evened out. As a result, since the general rule in control technology is that only fluctuations having a duration which exceeds the control time lag by 4 to 5 times can be levelled out without the danger of the control system becoming instable, and since normal can filling time is presently approximately 30 minutes, only fluctuation periods exceeding 2 hours can be controlled. A large part of the fluctuations caused by the opening equipment, however, has been of shorter duration and thus cannot be levelled out.

Accordingly, it is an object of the invention to eliminate variations in the condensation of a flock material column deposited in a feed chute so that a very even output at the delivery end of the chute can be obtained.

It is another object of the invention to prevent the occurrence of variations in loose fiber material deposited into and processed through a chute in a spinning installation.

It is another object of the invention to avoid irregularities in the output of a chute in a fiber processing apparatus.

It is another object of the invention to effect an even output from a single chute as well as a plurality of feed chutes supplied from a common transporting duct.

It is another object of the invention to level out variations in the density of a delivered fiber material in a plurality of feed chutes connected to a common transporting duct.

It is another object of the invention to control pressure conditions in the chutes without any influence by the flock material column level to thus eliminate deviations in the flock material column density resulting from such influences.

It is another object of the invention to not only eliminate irregularities originating in the transporting duct between the beating point and the feed chutes and during the separation, but also to eliminate a major part of the long term variations in the fiber material supply originating from the opening processes down to a duration of fluctuation of several minutes only, so that in most cases all further levelling in drafting processes with the continuous sliver of fibers, e.g., with the card sliver can be eliminated.

It is another object of the invention to level out flock layer weight variations while avoiding oscillations of the control system.

It is another object of the invention to obtain conditions for optimum setting off a control system for pressurizing flock material columns.

It is another object of the invention to be able to avoid variations in an escape cross-sectional area for transporting air through a chute wall while eliminating flock column level variations.

It is another object of the invention to avoid any need to vary the speed of the withdrawal rollers of a chute in order to adjust the density of the fiber arrangement withdrawn from the chute.

Briefly, the invention provides a method and apparatus of producing an even continuous arrangement of fibers from a continuous stream of individualized fiber flocks.

In accordance with the method, a fiber flock column is formed in a feed chute by depositing at least a portion of the fibers of the continuous stream into the chute. While the upper end of the column is subjected to the pressure in the duct, the lower end of the column is subjected to a lower pressure so that a pressure drop is created longitudinally through the fiber flock column. The pressure drop thus serves to condense, or compress, the fiber material in the column. In addition, the fiber material is removed from the chute in a suitable arrangement such as a fiber layer and is monitored for deviations in thickness or other characteristics of the mass of the fiber layer from a preset value. The deviations are then used to vary the pressure drop in the chute so as to change the degree of condensation of the fiber flock column in order to eliminate subsequent deviations.

In one embodiment, the measurements of the fiber layer delivered from the feed chute are taken near the end of the chute as the fiber layer is delivered. In other embodiments, the measurements are taken e.g. at the take-in roll or the delivery end of a card associated with the feed chute, or on either side of a drawframe connected to a plurality of cards connected with a similar plurality of feed chutes connected in common to a transporting duct. In these various cases, the time lag between when the measurements are taken and when a correction in the pressure drop are brought about varies from an optimum minimum to a slightly higher minimum.

In still another embodiment, the level of the fiber block column is maintained at a constant level while the measurements are taken.

In accordance with the invention the apparatus includes a pressurized transporting duct from which one or more feed chutes depend. Each feed chute is constructed to form a fiber flock column therein and to create a pressure drop longitudinally of the column so that the pressure drop serves to condense the fiber material in the column. Suitable means are also provided to remove the fiber material from each chute in a fiber arrangement e.g., a layer for delivery to a machine such as a card. In addition, a measuring device is provided for measuring deviations of the thickness or density of the fiber arrangement from a preset value and is connected with a pressure varying means which creates the pressure in the transporting duct in order to control the operation of this means for changing the degree of pressure drop in the chute.

In one embodiment, the means for creating the pressure in the transporting duct is a fan, the rotation of which is varied in accordance with the sense of the deviation in the fiber arrangement. In another embodiment, this means is in the form of a baffle which is movably mounted in the duct downstream of the chutes for changing the cross-sectional flow area of the duct and thus the pressure.

In those instances where a chute can be supplied with flocks in a manner, as is known (compare U.S. Pat. No. 3,400,518) so that no feed back of flocks occurs and wherein the whole flock carrying transporting air stream escapes via a perforated wall of the chute, changes in air pressure, and thus deviations of the weight of the fiber arrangement which are caused by variations of the flock level which are unavoidable in this type of chute, can be levelled out by the proposed control system to a degree which in many cases is entirely sufficient. The control power of this embodiment, however, is limited due to the non-ideal control characteristics. This however, can be overcome by keeping the free escape cross-section area constant.

An apparatus for implementing this latter embodiment includes a chute which is provided with a perforated zone for draining the transporting air and a flock column level control device in the region of the perforated zone which controls the quantity of fiber flocks to be supplied in order to maintain the flock column level.

The expression "fiber layer" used herein describes a continuous fiber arrangement composed of fiber comprising the fiber material as delivered by feed chutes as well as slivers as delivered by a card or a drawframe.

These and other objects and advantages of the invention will become more apparent from the following detailed description and appended claims taken in conjunction with the accompanying drawings in which:

FIG. 1 illustrates a side view of a plant for pneumatically supplying feed chutes for depositing flocks in a carding room;

FIG. 2 illustrates a plan view of the plant of FIG. 1;

FIG. 3 illustrates a side view of another plant for pneumatically supplying feed chutes for depositing flocks in a carding room;

FIG. 4 illustrates a plan view of the plant of FIG. 3;

FIG. 5 illustrates a cross-sectional view of a flock feeder according to the invention;

Figures 6, 7:
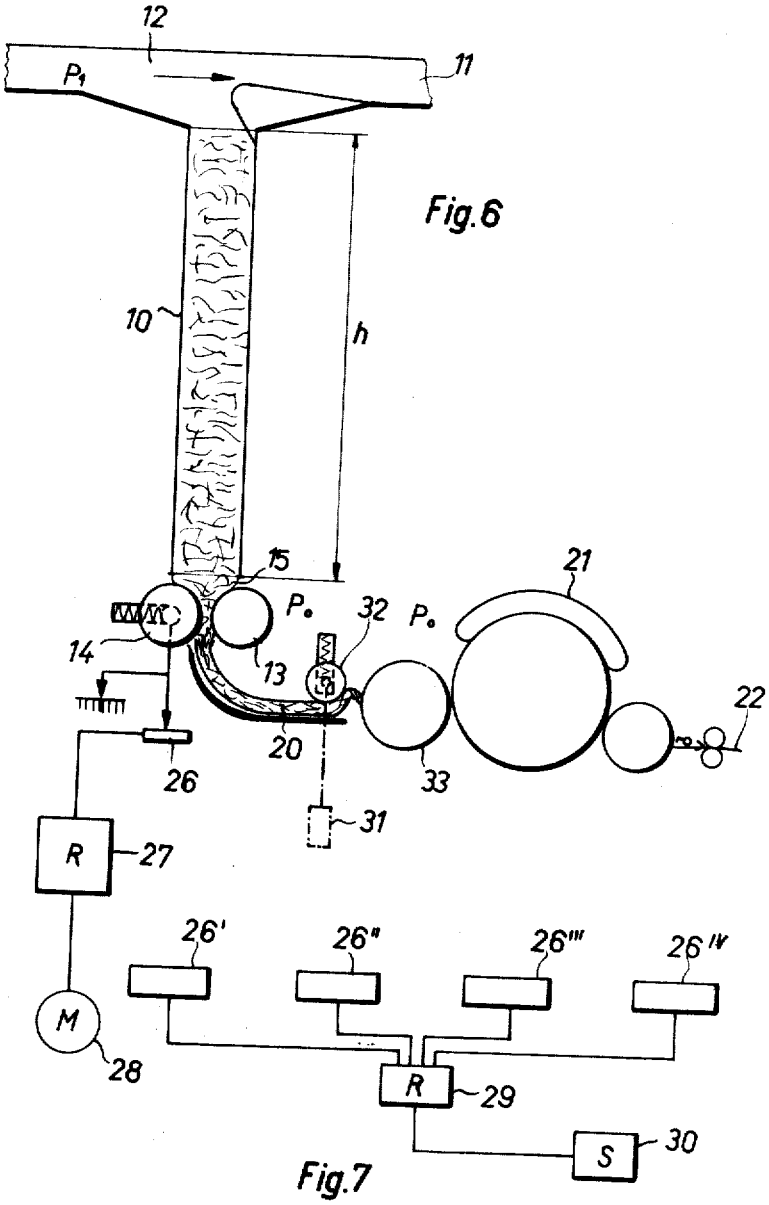
Figure 8:
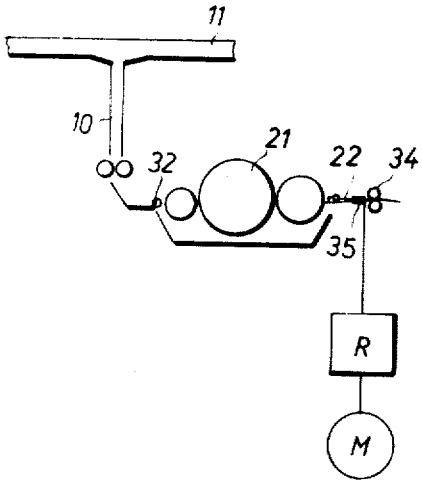
Figure 9:
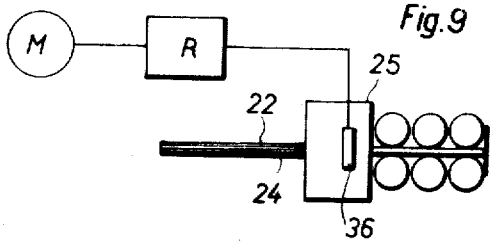
Figure 10:
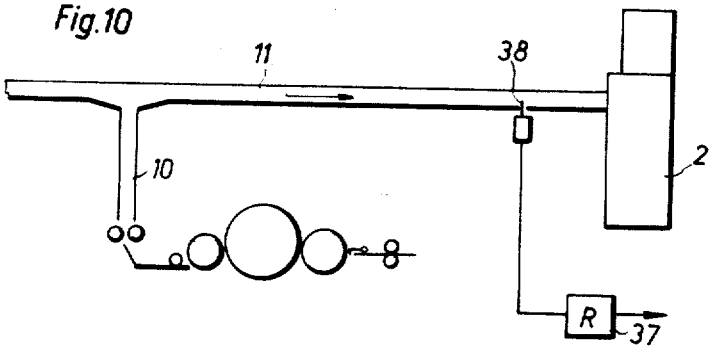
Figure 11:
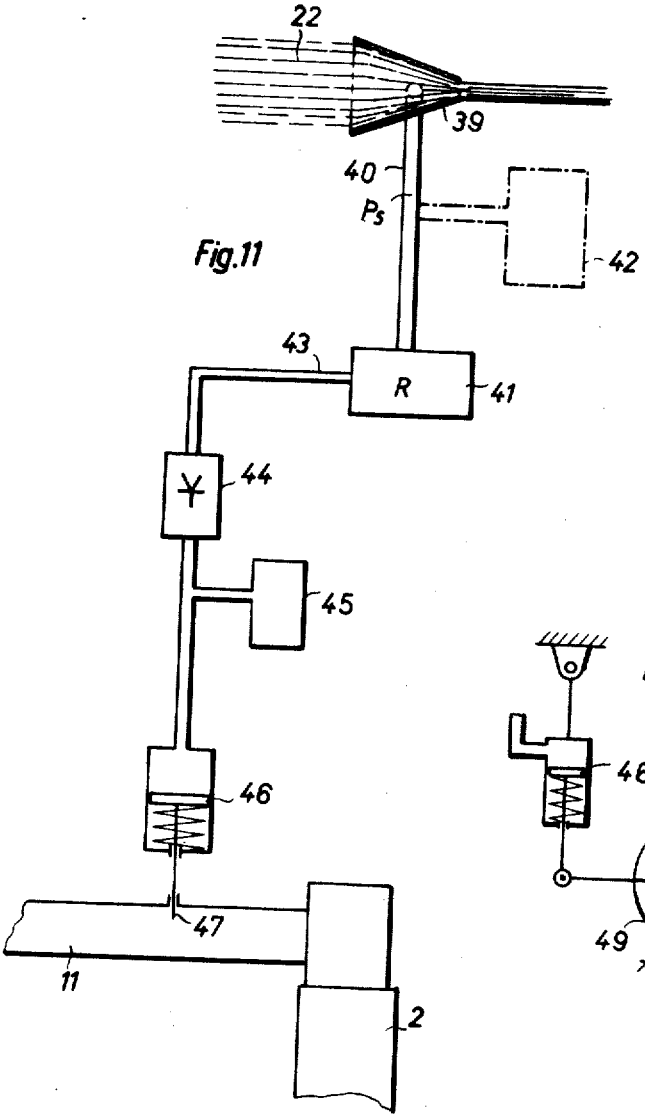
Figure 12:
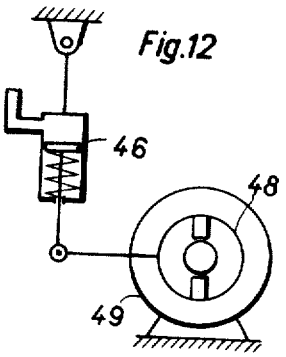
Figure 13:
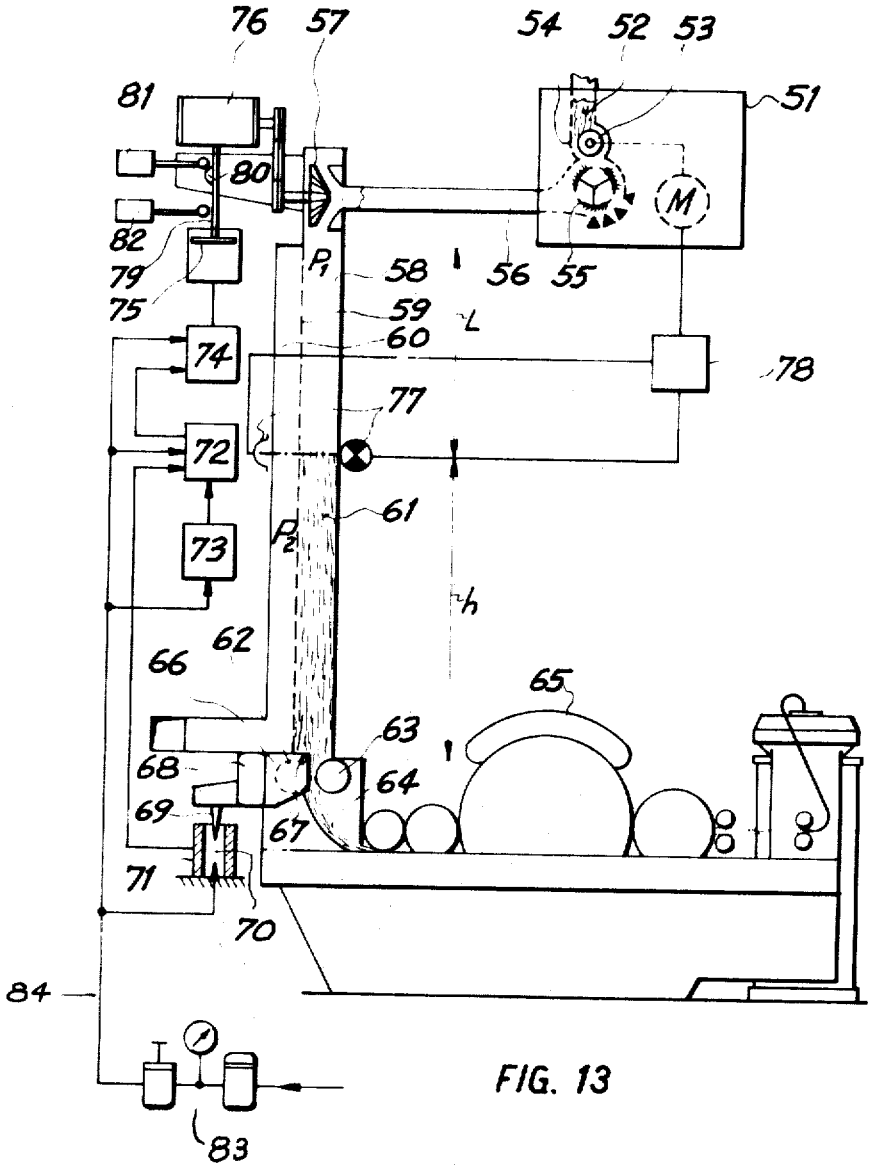

FIG. 6 schematically illustrates a control system for controlling the air pressure within a feed chute according to the invention;

FIG. 7 schematically illustrates a control system associated with a plurality of cards according to the invention;

FIG. 8 schematically illustrates a control system in accordance with the invention for measuring a sliver delivered by a card;

FIG. 9 schematically illustrates a control system according to the invention for measuring a plurality of slivers on a drawframe;

FIG. 10 schematically illustrates a control system of the invention utilizing a baffle in the transporting duct;

FIG. 11 schematically illustrates a control system according to the invention wherein a baffle in a transporting duct is moved in accordance with the passage of a plurality of slivers through a funnel;

FIG. 12 illustrates a modified control system for controlling a motor for a fan in the transporting duct according to the invention; and FIG. 13 schematically illustrates another control system according to the invention for controlling the air pressure within a single perforated feed chute.

Referring to FIGS. 1 and 2, a fiber procesing plant includes a supply duct 1 which supplies fiber material e.g. pneumatically by means of a transporting air stream from a suitable opening and cleaning apparatus (not shown) located upstream of the duct 1 to a flock feeder 2.

Referring to FIG. 5, the flock feeder 2, in turn, has a condenser 3 mounted therein which serves to separate the fiber material from the transporting air stream by means of a perforated drum (not shown) and to deposit the separated fiber material into a reserve chute 4 (FIG. 5).

A feed roll 5 and pedal levers 6 are mounted to form a nip below the chute 4 so as to transfer the fiber material to a beater 7, e.g., "Kirschner-Beater," which opens the fiber material into fine flocks. A transporting fan 8 connects via an inlet opening 18 to a room, or chamber, 9 surrounding the beater 7. This fan 8 serves to draw in the flocks and the transporting air stream from the surrounding room and to transfer the flocks and air stream in the form of a continuous flock stream into a transporting duct 11 arranged above and connected in common to a plurality of vertical chutes 10.

Referring to FIG. 6, each chute 10 is connected with the transporting duct 11 via a separator head 12 by means of which the flocks are deflected from the flock stream into the chute 10. During operation, the supply of flocks continues until the fiber flock column deposited in the chute 10 builds up to the level of the separator head 12 thus reaching a height h. In addition, a pair of takeoff rolls 13, 14 is arranged with a clearance 15 below the lower end of each chute 10 such that the lower end of the chute 10 is not hermetically sealed from the surrounding room. During operation, a pressure $p_1$ exists in the transporting duct 11 while a lower pressure $p_0$ exists in the surrounding room. As a result, a pressure drop or differential $\Delta p = p_1 - p_0$ develops in the transporting medium between the lower chute end and the upper level h of the flock column so that the column is compressed, i.e., condensed, under the influence of the pressure drop $\Delta p$. In this manner, all the chutes 10 filled with fiber material are influenced by this pressure drop $\Delta p$.

Referring again to FIG. 5, the tranpsorting air, as far as it has not leaked via the small clearance 15 at the lower chute ends, returns into a feed back chute 16 of the flock feeder 2 carrying excessive flock material therewith. In addition, an air duct 17, the inlet of which is suitably arranged, again exhausts the transporting air into the room 9 from which the air is taken into the inlet opening 18 of the fan 8 while the flocks remain in the feed back chute 16. A plurality of continuously driven metering rolls 19 are used to transfer the flocks in the chute 16 via the beater 7 without passing, however, through any nip, back into the inlet opening 18 and thus into the transporting air circuit.

Referring to FIGS. 1 and 2 the fiber layer 20 delivered from the chutes 10 by the take-off rolls 13, 14 is in a compacted state and is transferred into a card 21 to which a chute 10 is connected. Each card 21 produces a sliver 22 which is deposited into a can 23 as is known.

Referring to FIGS. 3 and 4, wherein like reference characters indicate like parts as above, the cards 21 can alternatively deposit the sliver, e.g., via a sliver reserve box (not shown) onto a sliver transporting device such as a transporting belt 24 extending along a row of cards 21. The slivers 22 can then be placed successively side-by-side onto the belt 24 and supplied jointly to a drawframe 25.

Referring ot FIG. 6 in either of the above cases, as the pressure drop $\Delta p$ acting on the fiber flock column increases, the condensation of the fiber flock columns in the chutes 10 becomes more intense. As a result, this relation can be checked by monitoring the thickness of the fiber layer 20 delivered at the lower end of the chute 10 by the take-off rolls 13, 14. To this end, one of the supporting rolls 14 is movably supported under a spring pressure and is connected by a suitable means to a measuring device 26 so that the movements of the supporting roll 14 during changes in thickness of the layer 20 passing from the nip between the rolls 13, 14 can be detected and measured. The measuring device 26 which can be of any suitable structure is also used to emit an electrical signal proportional to the roll deviation from a preset position to a control device 27. The control device 27, in turn, is connected to the motor 28 of the fan 8 (FIG. 5) so as to vary the speed of the fan 8 in response to the signal received from the measuring device 26. The control device 27, thus functions as a correcting element of the control loop to adapt the pressure $p_1$, to a required value until the deviation of the measured fiber layer thickness from the preset thickness value has vanished. In this regard, the control device 27 can be of any suitable commercially available device in which a proportional characteristic, or an integral characteristic, or if desired, a PID characteristic can be set.

Depending on whether the measuring device 26 detects and measures a decrease or increase in the thickness of the layer 20, the rpessure $p_1$ in the transporting duct 11 is varied so that subsequent condensation of the flock column in the chute 10 is thus correspondingly increased or decreased. In this manner, weight variations in the fiber layer 20 are levelled out practically without any time lag, as such variations are measured at the earliest moment possible, i.e., as the fiber layer 20 leaves the chute 10, and as the flock column reacts to the increase in pressure in the transporting duct 11 with an increased condensing effect down to the lowest portion thereof without any delay. In this respect, the flock column behaves like a spring with non-linear characteristics which is compressed under pressure, i.e., the flock column is compressed proportionally in its lowest portion immediately above the take-off roll, not considering the influences of friction against the chute walls and of gravity. The system thus functions with a negligible time lag.

If a plurality of feed chutes 10 are connected to a common transporting duct 11, it is entirely sufficient to control the fan speed according to the measurements taken at one single chute 10 only and thus to control flock condensation jointly in all flock columns. A most simple central control can therefore be obtained. Furthermore, one measuring device each can be provided at two or three feed chutes connected to a common transporting duct with the signals of each measuring device being alternatingly transmitted to the control device 27. In this way, if the measuring device connected to the control device happens to be located at a chute which is out of operation at a given time, the connection can be switched over to another measuring device located at an operating chute.

Referring to FIG. 7 a further alternative consists in the arrangement of a measuring device 26', 26'', 26''', 26$^{IV}$ at each card (not shown) either upstream or downstream thereof for measuring the thickness of sliver produced with the devices being connected to a common control device 29 which establishes the arithmetic means of the signals received from the measuring devices 26'–26$^{IV}$ and then influences a correcting member 30, which can be the fan 8 as described above, or a throttling baffle as described below (FIG. 10) in dependence on the arithmetic mean.

Referring to FIG. 6, the measurement of the fiber layer 20 also can be effected by means of a measuring device 31 located at a feed roll 32 for the taker-in 33 (licker-in) of the card 21 if a time lag of one to two minutes for transporting the material from the take-off rolls 13, 14 to the feed roll 32 can be tolerated as a reaction time lag of the control loop. The measurement obtained in the device 31 is then used in similar fashion as above to control the speed of a fan motor as above or a throttling baffle as below.

Referring to FIG. 8, a measuring device 35 can alternatively be provided to measure the thickness of the sliver 22 delivered from the cards 21 as the sliver enters the nip of a pair of calender rolls 34. The measurements obtained are then used as above to produce a signal which is processed further to effect the pressure $p_1$ in the transporting duct 11. In this case, since the throughput time of the card is within a few seconds, the reaction time lag, as compared to the arrangement in which the measuring device is provided at the feed roll 32, is only insignificantly increased.

Where the cards are to deliver the sliver into cans as shown in FIGS. 1 and 2, the methods and measuring devices described above are to be used. However, where the cards deliver the sliver onto a common sliver transporting arrangement e.g., as shown in FIGS. 3 and 4, additional methods and measuring devices as described below can be used.

Referring to FIG. 9, a measuring device 36 is located on the drawframe 25 supplied with slivers 22 by the common sliver transporting arrangement 24 in order to measure the thickness or density of the sliver 22. In this case the reaction time lag is increased by approximately 15 to 20 seconds, the advantage, however, is that a summarized measuring value of the slivers 22 is obtained rather than individual measuring values.

Referring to FIG. 10, instead of varying the speed of the fan 8 (FIGS. 1 and 3) to vary the pressure $p_1$ in the transporting duct 11, a baffle 38 is provided in the duct section between the last chute 10 and the flock feeder 2 and is controlled via a control device 37 to narrow or enlarge the effective duct cross-section area of the duct 1 and thus change the pressure $p_1$ prevailing in the duct 1. The control device 37 is actuated in any of the manners described above in dependence on the fiber layer or sliver thickness of mass.

Referring to FIG. 11, instead of measuring the thickness of the fiber material, another characteristic of the density or mass of the fiber material can be measured. To this end, in order to measure the fiber mass of a plurality of slivers 22, a measuring funnel 39 is interposed in the path of the slivers 22 so that the slivers 22 are brought together in passing through the funnel 39. In addition, a duct 40 is connected to communicate with the interior of the funnel 39 so as to have a signal pressure $p_s$ produced within the duct 40. This signal pressure $p_s$ depends on the fiber mass passed through the funel 39. The duct 40 is further connected to a pneumatic control device 41, e.g., via a dampening element 42 so that the signal pressure $p_s$ can be transmitted thereto. The control device 41 serves to generate a control pressure which is emitted at an output 43 and transferred via a throttling valve 44 and dampening element 45 to a piston 46 in order to move the piston 46. The piston 46 is, in turn, connected to a baffle 47 located within a transporting duct 11 so that the piston movements are transferred to the baffle 47. In this way, the movements of the baffle 47 serve to vary the cross-sectional flow area of the duct 11 and thus the pressure $p_1$.

Alternatively, referring to FIG. 12, the movements of the piston 46 can be used to adjust the position of the brushes 48 of a commutator motor 49 of a fan (8 as shown in FIGS. 1 and 3) to vary the pressure $p_1$.

As a further alternative, the control of the pressure $p_1$ can be effected intermittently by means of a two-point level switch. In this case, the correction would start only when a predetermined deviation from a set value is measured.

Referring to FIG. 13, a flock feeder 51 having a feed chute 52 is supplied with fiber material from a source such as an opening machine (not shown) while a take-in roll 53 transfers the material via a trough 54 to a beater 55, which opens the material into fine flocks. A suction nozzle 56 of a material transporting fan 57 is in communication with the beater 55 to transport the material into a chute 58 arranged on the pressurized side of the fan 57. The chute 58 includes a perforated wall 59 which opens to an exhaust duct 60 so that the flock carrying air stream can escape into the duct 60 while the flocks are retained by the air stream on the inside of the wall 59 due to an appropriate small size of the perforations. The flocks are thus deposited in the form of a flock column 61.

During operation, a pressure $p_2$ prevails in the exhaust duct 60 while a lower pressure $p_1$ is maintained by the fan 57 above the flock column. A pressure drop $\Delta p$ thus occurs to bring about a condensing of the column. The flock column thus formed is additionally condensed by a pair of take-off rolls 62, 63 and is transferred in the form of a fiber layer 64 to a machine for taking in the fiber layer 64, e.g., to a card 65.

The left hand roll 62 of the take-off rolls 62, 63 is mounted in a bearing 66 and together therewith pivots around a pivoting point 67 and is pressed against the roll 63 by a weight 68. The bearing 66 also supports a conical pin 69 which penetrates into a bore 70 of a member 71 through which air flows. The pin 69 is mounted and sized so that the middle position of the pin 69 corresponds e.g., to the set value of the fiber layer weight. The members 69, 70 and 71 thus form a pneumatic signal transmitter which acts on a control mechanism 72 in order to transmit a signal thereto corresponding to the air flow through the member 71. A set valve transmitter 73 is also connected to the control mechanism 72 to transmit a preset signal thereto. A signal proportional to the mass deviation is obtained in the control mechanism 72 when a deviation occurs and is transferred to an amplifier 74, the pneumatic output signal of which directly displaces a piston 75. The piston 75, in turn, is connected to the motor 76 of the fan 57 to change the rotational speed of the motor 76 and thus change the pressure $p_1$ in the chute 58. A suitable means 83 is also provided to supply air via a line 84 to the various components 71–74 for use in the operation of these components.

The condition for optimum action of this control system is the elimination of influences which could result in control deficiencies, such as e.g., elimination of clogging of the perforations in the wall 59 by choosing suitable shapes for the perforations, e.g., narrow vertical slots and/or suitable materials on which fibers are not caught. Furthermore, care should be taken that the pressure $p_2$ is not subject to excessively large variations.

It is of particular importance, however, for good control characteristics that the air throughput zone L provided in the perforated wall 59 above the flock column h, which zone actually is a throttle point by mainstream, is maintained constant. This is achieved by maintaining the height h of the flock column constant, for example, very simply by means of a photocell arrangement 77 and a relay 78 arranged at the desired height h. The relay 78 switches the take-in roll 53 off as the light beam of the photo cell arrangement 77 is interrupted and switches the take-in roll 53 on as a photo current again reaches the relay 78. If the chute 58 is of a certain minimum height, a time delay in the on and off switching can be used to reduce the switching frequency, without causing excessive deviations of the air escape height to the flock column height from the value desired. Another alternative construction consists in reducing or increasing the rotational speed of the take-in roll 53 so that the desired height h of the flock column is maintained constant at all times.

In order to provide for a limiting range of control movements, the piston rod 79 of the piston 75 is provided with a cam 80 which serves to activate a pair of limit switches 81 and 82 each of which is disposed at the outermost positions of the piston 75. These limit switches are activated as the limits of the control range are reached, which may be the case if disturbances of the material supply or lap-ups on the rolls 62 and 63 occur. The limit switches 81, 82 can also be used for activating an acoustical or optical alarm system or for stopping the material transport upstream and downstream from the chute.

This latter arrangement presents a number of advantages insofar as it is suitable for a high-production individual chute feed without material feed back wherein a pressure drop control satisfying all the requirements presently demanded can be obtained in simple manner, it is a further advantage that a normal suction duct only is required to the flock supplying machine since the pressure generating device can be positioned in the upper part of the chute. This arrangement permits handling of large quantities of air and flocks such as more than 50 kg. per hour as needed for feeding ultra high production cards or other machines of high production rates processing fiber layers.

It is to be noted that in the case of a high material throughput in the machine connected to the feed chute, in an extreme case, a feed chute 10 as shown in FIG. 6 can be fed directly by a flock feeder 2 with the duct 11 feeding directly back into the flock feeder 2. This system then consists, as a whole, apart from the flock feeder and the transporting duct 11, of only one chute.

It is also noted that if a plurality of chutes 10 are arranged in the feeding and backfeeding portions of the transporting duct 11, a central pressure control can be effected using a single guide chute equipped with a measuring device. In this case, a measuring device is associated with only one of a number of guide chutes connected to a common air transporting duct and is connected to a pressure generating device in the air transporting duct. Should the fiber arrangement from the chute vary, the measuring device detects the variation and adjusts the pressure generating device to eliminate subsequent variations. Thus, there is no need to change the speed of the withdrawing rollers at the various chutes. As a result, not only is there no need for rotational speed control devices for the withdrawal rollers at the various chutes but also there is no need for measuring devices at the other chutes. This, results in a considerable savings. The invention thus enables a density control in a plurality of chutes without being forced to resort to speed variation devices at the chutes and the cards which would involve considerable changes in the driving arrangements of the withdrawing rollers of the chutes with respect to those of the cards.

The invention thus provides a means by which reaction time lag can practically be eliminated by arranging the measuring device at the take-off rolls of the chute so that the control system reacts very quickly. Further, if the measuring device is arranged at the card delivery, the reaction time lag achieved is still sufficiently small considering the card production rates presently used so that a major part of the variations originating in the opening and cleaning equipment can be eliminated.

The use of the invention in a card feeding system presents a number of particular advantages which are enumerated in the following.

In an arrangement using a fan or an adjustable throttling baffle as a correcting element of the control loop, no factor connected with the material supply to the transporting duct is varied, i.e., no speeds of feeding element must be varied. Instead, control is achieved by means of the transporting medium itself, the transporting means of which must be provided in any case.

Under certain conditions, in the use of a silver transporting arrangement with an auto-levelling drawframe, which is used to level out short term as well as long term variations, the invention allows replacement of the auto-levelling drawframe by a simple drawframe which compensates for sliver breakage only, i.e., which corrects the drawing ratio by means of a simple speed change gear. If, however, the auto-levelling drawframe should not be dispensed with due to its levelling of the short term variations, such an auto-levelling mechanism can be constructed in a much simpler and less expensive manner, as it need merely level out short term variations.

It is a further very important advantage of the invention that the control mechanism can be built into existing plants with only minor machine adaptations.

What is claimed is:

1. A method of producing an even continuous arrangement of fibers from a continuous stream of individualized flocks of fibers comprising the steps of guiding the stream into a chute, depositing the flocks in the stream in the chute to form a fiber flock column, draining the air in the stream from the chute above the fiber flock column, maintaining a constant free air escape zone for the draining of the air, providing a lower pressure at the lower end of the fiber flock column to create an air pressure drop applied to the fiber flock column for condensing the column, removing the fiber material from the fiber flock column in the chute in the form of a continuous fiber arrangement;

measuring the fiber arrangement removed from the chute to determine a deviation of the mass of the arrangment from a preset mass; and changing the pressure drop in correspondence to the occurrence of a deviation of the mass of the arrangement from the preset mass to obtain an even continuous fiber arrangement from the chute.

2. In a method of producing an even continuous arrangement of fibers the steps of forming a fiber flock column, subjecting the fiber flock column to an air pressure differential longitudinally of the column for condensing the fiber material in the column, removing a fiber layer from the column, measuring a characteristic of the mass of the removed fiber layer, comparing the measured charactertistic of the fiber layer with a preset value to determine a deviation therefrom, and changing the pressure differential on the column in response to the occurrence of a deviation of the measured characteristic from the preset value to eliminate the occurrence of a subsequent deviation.

3. A method of producing an even continuous fiber arrangement from a continuous stream of individualized fiber flocks comprising the steps of depositing at least a portion of the fibers of the continuous stream into a chute to form a fiber flock column therein, subjecting the fiber flock column to a lower pressure at the lower portion thereof than on the upper end thereof to create an air pressure drop to which the fiber flock column is subjected for condensing the fiber flock column, removing the fiber material from the fiber flock column in the chute in the form of a continuous fiber arrangement;

measuring the continuous fiber arrangement to determine a deviation of the mass of the arrangement from a preset mass; and changing the air pressure drop in response to the occurrence of a deviation of the mass of the continuous fiber arrangement from the preset mass.

4. A method of producing an even continuous fiber arrangement from a stream of individualized fiber flocks comprising the steps of depositing at least a portion of the fibers of the stream into a chute to form a fiber flock column therein;

subjecting the fiber flock column to a lower air pressure at the lower portion thereof than on the upper end thereof to create an air pressure drop to which the fiber flock column is subjected for condensing the fiber flock column;

removing the fiber material from the fiber flock column at the lower end of the chute in the form of a continuous fiber arrangement;

measuring the mass of the fiber adjacent to the lower end of the chute to determine a deviation of the mass from a preset mass; and changing the air pressure drop in response to the occurrence of a deviation of the mass of the fiber from the preset mass.

5. A method of producing an even continuous fiber arrangement from a continuous stream of individualized fiber flocks comprising the steps of depositing at least a portion of the fibers of the continuous stream into a chute to form a fiber flock column therein, subjecting the fiber flock column to a lower pressure at the lower portion thereof than on the upper end thereof to create an air pressure drop to which the fiber flock column is subjected for condensing the fiber flock column, removing the fiber material from the fiber flock column in the chute in the form of a continuous fiber arrangement;

measuring the fiber arrangement downstream of the chute to determine a deviation of the mass of the arrangement from a preset mass; and changing the pressure drop in response to the occurrence of a deviation of the mass of the arrangement from the present mass to obtain an even continuous fiber arrangement from the chute.

6. A method as set forth in claim 5 wherein a fan is connected in communication with the chute to generate the pressure at the upper end thereof and wherein the rotating speed of the fan is varied to effect the change in pressure drop.

7. A method as set forth in claim 5 wherein the fiber arrangement is measured upon leaving the chute.

8. A method as set forth in claim 5 wherein a plurality of chutes have a fiber flock column formed therein and removed therefrom in the form of a continuous fiber arrangement and wherein the fiber arrangements are each measured and an average value measurement is determined, said average value measurement being used to obtain a deviation from the preset mass.

9. A method as set forth in claim 5 wherein the chute is connected to a transporting duct to receive at least a portion of the stream of individualized fibers therefrom, and wherein the pressure in the transporting duct is changed to vary the pressure drop applied to the fiber flock column in the chute to adjust the condensation of the column to the present mass.

10. A method as forth in claim 9 wherein the cross-sectional flow area of the duct is varied to obtain a change in pressure.

11. An apparatus for producing an even continuous fiber arrangement from a stream of individualized fiber flocks comprising an air transporting duct for conveying the stream of individualized fiber flocks;

a feed chute connected to said duct for a formation of a fiber flock column therein from the stream, said chute and said duct being disposed to subject the fiber flock column in said chute to a pressure drop longitudinally of the column, and said chute having a perforated wall for draining of the air from the stream entering into said chute;

a level control device disposed in the region of said perforated wall for controlling the quantity of fiber flocks supplied to said chute to maintain a constant fiber flock column height therein;

means for varying the air pressure in said chute; and a measuring device disposed in the path of a fiber arrangement removed from said chute for measuring a characteristic of the mass of the removed arrangement, said measuring device being connected to said pressure varying means for controlling said pressure varying means in response to a measured characteristic deviating from a preset value to cause said pressure varying means to change the pressure in said chute for elimination of subsequent deviations.

12. An apparatus for producing an even continuous fiber arrangement from a continuous stream of individualized fiber flocks comprising an air transporting duct for conveying the continuous stream of individualized fiber flocks;

at least one feed chute connected to said transporting duct for a formation of a fiber flock column therein from the continuous stream, said chute and duct being disposed to subject the fiber flock column in said chute to an air pressure drop longitudinally of the column;

means for varying the air pressure drop in said chute; and a measuring device disposed in the path of the fiber arrangement downstream of said chute for measuring a characteristic of the mass of the arrangement, said measuring device being connected to said pressure varying means to control said pressure varying means in response to a measured characteristic deviating from a preset value to cause said means to change the air pressure drop in said chute for elimination of subsequent deviations.

13. An apparatus as set forth in claim 12 which further comprises take-off rolls at the end of said chute for removing the fiber arrangement and wherein said measuring device is positioned on said take-off rolls.

14. An apparatus as set forth in claim 12 wherein said means includes a fan of variable rotational speed arranged upstream of said chute, the rotational speed of said fan being varied in response to a measured deviation.

15. An apparatus as set forth in claim 14 wherein said fan is disposed within said duct.

16. An apparatus as set forth in claim 12 wherein said means is mounted in said duct downstream of said chute for varying the cross-sectional flow area of said duct thereat in response to a measured deviation to vary the pressure in said duct.

17. An apparatus as set forth in claim 16 wherein said means is a movably mounted baffle.

18. An apparatus as set forth in claim 12 which further comprises a machine for receiving the removed fiber arrangement including a feed roller for conveying the fiber arrangement therein and wherein said measuring device is mounted on said feed roll.

19. An apparatus as set forth in claim 18 wherein said machine is a card.

20. An apparatus as set forth in claim 12 which further comprises a machine for receiving the removed fiber arrangement and wherein said measuring device is mounted downstream of said machine on a delivery side thereof.

21. An apparatus as set forth in claim 20 wherein said machine is a card.

22. An apparatus as set forth in claim 12 wherein said measuring device includes a control loop comprising a pneumatic measuring device, a pneumatic control device connected to said pneumatic measuring device and a piston connected to and between said control device and said pressure varying means for controlling said pressure varying means in response to actuation of said control device.

References Cited

The following references, cited by the Examiner, are of record in the patented file of this patent or the original patent.

UNITED STATES PATENTS

| | | | |
|---|---|---|---|
| 3,414,330 | 12/1968 | Trützschler | 19—105 CF |
| 3,562,866 | 2/1971 | Roberson et al. | 19—240 |
| 3,552,800 | 1/1971 | Trützschler | 19—105 CF |
| 3,536,002 | 10/1970 | Miller | 222—55 X |

ROBERT B. REEVES, Primary Examiner

T. E. KOCOVSKY, Assistant Examiner

U.S. Cl. X.R.

19—105 CF, 240; 302—28

UNITED STATES PATENT OFFICE

CERTIFICATE OF CORRECTION

Patent No. RE 27,967 Dated April 9, 1974

Inventor(s) Rolf Binder et al

It is certified that error appears in the above-identified patent and that said Letters Patent are hereby corrected as shown below:

Column 2, line 25, "silver" should be --sliver--.

Column 6, line 15, "rpessure" should be --pressure--.

Column 8, line 44, "by" should be --in the--.

Column 8, line 44, "main" should be --air--.

Column 9, line 56, "use" should be --case--.

Column 9, line 56, "silver" should be --sliver--.

Column 11, line 20, "present" should be --preset--.

Column 11, line 42, "present" should be --preset--.

Signed and sealed this 5th day of November 1974.

(SEAL)
Attest:

McCOY M. GIBSON JR.
Attesting Officer

C. MARSHALL DANN
Commissioner of Patents